US012474292B2

(12) United States Patent
Furuta et al.

(10) Patent No.: US 12,474,292 B2
(45) Date of Patent: Nov. 18, 2025

(54) GAS SENSOR ELEMENT, GAS SENSOR, AND MANUFACTURING METHOD FOR GAS SENSOR ELEMENT

(71) Applicant: NGK SPARK PLUG CO., LTD., Nagoya (JP)

(72) Inventors: Hitoshi Furuta, Nagoya (JP); Akinori Kojima, Nagoya (JP); Kentaro Kamada, Nagoya (JP); Yosuke Suzuki, Nagoya (JP)

(73) Assignee: Niterra Co., Ltd., Nagoya (JP)

( * ) Notice: Subject to any disclaimer, the term of this patent is extended or adjusted under 35 U.S.C. 154(b) by 537 days.

(21) Appl. No.: 17/899,212

(22) Filed: Aug. 30, 2022

(65) Prior Publication Data

US 2023/0068377 A1    Mar. 2, 2023

(30) Foreign Application Priority Data

Aug. 31, 2021  (JP) .................................. 2021-141677

(51) Int. Cl.
    *G01N 27/407*     (2006.01)
(52) U.S. Cl.
    CPC .............................. *G01N 27/4071* (2013.01)
(58) Field of Classification Search
    None
    See application file for complete search history.

(56) References Cited

U.S. PATENT DOCUMENTS

2020/0003723 A1    1/2020  Kamada et al.

FOREIGN PATENT DOCUMENTS

JP       2003294690 A   * 10/2003
JP       2020-003286 A    1/2020

* cited by examiner

*Primary Examiner* — J. Christopher Ball
(74) *Attorney, Agent, or Firm* — Sughrue Mion, PLLC

(57) ABSTRACT

A gas sensor element includes: a first ceramic structure (100A) having a detection cell (120); a second ceramic structure (100B) having a pump cell (110) disposed apart from the first ceramic structure in a lamination direction; and a third ceramic structure (100C) having a frame-shaped body (200) surrounding a space (150a) formed between the first and second ceramic structures, the frame-shaped body including a gas introduction portion (151) and a peripheral wall portion (141). A gap (150b) connected to the space (150a) is formed between an opposed surface (151b1) and the second ceramic structure. A ceramic buffer layer (300) having a lower shrinkage start temperature than a material for forming the gas introduction portion is formed on the opposed surface so as to overlap a boundary portion X between an edge (150b1) on the external side of the gap and the second ceramic structure when viewed in the lamination direction.

12 Claims, 11 Drawing Sheets

GAS SENSOR ELEMENT, GAS SENSOR, AND MANUFACTURING METHOD FOR GAS SENSOR ELEMENT

BACKGROUND OF THE INVENTION

1. Field of the Invention

The present invention relates to a gas sensor element, a gas sensor, and a manufacturing method for a gas sensor element.

2. Description of the Related Art

A gas sensor for measuring the concentration of a specific component (concentration of oxygen or the like) in exhaust gas of an internal combustion engine is known. Such a type of gas sensor includes a gas sensor element mainly made of ceramic. The gas sensor element is composed of a plurality of laminated plate-shaped ceramics (ceramic structures), and has therein a space which is used as a measurement chamber. This space is surrounded by two plate-shaped ceramics disposed with an interval therebetween in the lamination direction and a frame-shaped ceramic disposed between these ceramics. The frame-shaped ceramic mainly includes a gas introduction portion made of a porous ceramic, and a peripheral wall portion made of a dense ceramic.

In the case of manufacturing such a gas sensor element, for example, printing technology is used as described in Patent Document 1. In this case, for example, a layer for forming an insulating layer is formed on a surface of an unfired sheet on which an electrode pattern, etc., are provided, by printing using an alumina slurry. In the layer, an opening in which no slurry is placed is formed at a location corresponding to the space, and a cutout in which no slurry is placed is formed at a location corresponding to the gas introduction portion. The cutout is connected to the opening, and a separately prepared unfired gas introduction portion is placed so as to fill the cutout. A portion, of the layer, surrounding the opening is a portion corresponding to the peripheral wall portion. Then, a layer of carbon paste (burn-out material to be burnt out during firing) is formed in the opening by printing such that a shape (space) is maintained during firing.

After various printed layers, etc., are formed on a predetermined sheet as described above, another unfired sheet or the like is laminated so as to cover the printed layers, etc. When the obtained unfired laminate is fired at a predetermined temperature, a gas sensor element is obtained.

[Patent Document 1] Japanese Patent Application Laid-Open (kokai) No. 2020-3286

3. Problems to be Solved by the Invention

When forming a layer of carbon paste (hereinafter, also referred to as "paste layer") so as to overlap the opening by printing during the manufacture of the gas sensor element, the paste layer is normally formed in advance with a large size such that the peripheral edge thereof protrudes from the opening. This is in consideration of the occurrence of printing misalignment or the like. Therefore, the peripheral edge of the paste layer overlaps the unfired gas introduction portion surrounding the opening, and the unfired peripheral wall portion, in the thickness direction (lamination direction).

However, when an unfired laminate including such a paste layer is fired, defects such as cracks may occur in a portion, of the gas introduction portion, which has been in contact with the peripheral edge of the paste layer. This is inferred to be the case because, during firing of the laminate, the paste layer starts shrinking before the unfired gas introduction portion. Consequently, the unfired gas introduction portion is pulled and torn by the peripheral edge of the shrinking paste layer.

SUMMARY OF THE INVENTION

It is therefore an object of the present invention to provide a gas sensor element including a gas introduction portion in which defects such as cracks are suppressed, etc.

The above object has been achieved by providing, in a first aspect of the invention, (1) a gas sensor element including a plurality of laminated plate-shaped ceramic structures including: a first ceramic structure which has a detection cell including a first solid electrolyte body and a pair of detection electrodes provided on opposing surfaces of the first solid electrolyte body; a second ceramic structure which has a pump cell including a second solid electrolyte body and a pair of pump electrodes provided on opposing surfaces of the second solid electrolyte body, the second ceramic structure being disposed apart from the first ceramic structure in a lamination direction; and a third ceramic structure which is a layer-shaped structure disposed between the first ceramic structure and the second ceramic structure and having a frame-shaped body surrounding a space formed between the first ceramic structure and the second ceramic structure, the frame-shaped body including a gas introduction portion having one end portion disposed on an external side and another end portion disposed on the space side and made of a porous ceramic allowing to-be-detected external gas to be introduced into the space while allowing the external gas to pass from the one end portion side to the other end portion side, and a peripheral wall portion made of a dense ceramic and surrounding the space together with the gas introduction portion, wherein a gap connected to the space is formed between an opposed surface, opposed to the second ceramic structure, of the other end portion of the gas introduction portion and the second ceramic structure, and the gas sensor element includes a buffer layer which is made of ceramic composed of a material having a lower shrinkage start temperature than a material forming the gas introduction portion and is formed on the opposed surface so as to overlap a boundary portion between an edge on the external side of the gap and the second ceramic structure when viewed in the lamination direction.

In a preferred embodiment (2) of the gas sensor element according to (1) above, the buffer layer is made of a porous ceramic containing pores larger than pores contained in the gas introduction portion.

In another preferred embodiment (3) of the gas sensor element according to (1) or (2) above, the buffer layer is formed on the opposed surface so as not to cover an end surface, facing the space, of the other end portion of the gas introduction portion.

In yet another preferred embodiment (4) of the gas sensor element according to any one of (1) to (3) above, the second ceramic structure includes a plate-shaped body portion which includes the pump cell, an adhesive layer which is disposed between the plate-shaped body portion and the third ceramic structure and is composed of a layer of a dense ceramic, and a reinforcing layer which is disposed between the plate-shaped body portion and the adhesive layer and is shaped so as to surround the space when viewed in the lamination direction.

In yet another preferred embodiment (5) of the gas sensor element according to any one of (1) to (4) above, a material for forming the buffer layer contains zirconia as a main component, and a material for forming the gas introduction portion contains alumina as a main component.

In a second aspect (6), the present invention provides a gas sensor including the gas sensor element according to any of (1) to (5) above.

In a third aspect (7), the present invention provides a manufacturing method for manufacturing a gas sensor element, the gas sensor element including a plurality of laminated plate-shaped ceramic structures including a first ceramic structure which has a detection cell including a first solid electrolyte body and a pair of detection electrodes provided on opposing surfaces of the first solid electrolyte body, a second ceramic structure which has a pump cell including a second solid electrolyte body and a pair of pump electrodes provided on opposing surfaces of the second solid electrolyte body, the second ceramic structure being disposed apart from the first ceramic structure in a lamination direction, and a third ceramic structure which is a layer-shaped structure disposed between the first ceramic structure and the second ceramic structure and having a frame-shaped body surrounding a space formed between the first ceramic structure and the second ceramic structure, the frame-shaped body including a gas introduction portion having one end portion disposed on an external side and another end portion disposed on the space side and made of a porous ceramic allowing to-be-detected external gas to be introduced into the space while allowing the external gas to pass from the one end portion side to the other end portion side, and a peripheral wall portion made of a dense ceramic and surrounding the space together with the gas introduction portion, the manufacturing method including: an installation step of installing an unfired gas introduction portion made of a material for forming the gas introduction portion and an unfired peripheral wall portion made of a material for forming the peripheral wall portion, on a first green sheet for forming the first ceramic structure, and forming an opening corresponding to the space, on an inner side of the unfired gas introduction portion and the unfired peripheral wall portion; a first formation step of forming an unfired buffer layer made of a material having a lower shrinkage start temperature than the unfired gas introduction portion, on an inner end portion, corresponding to the other end portion, disposed on the opening side of the unfired gas introduction portion, in an overlapping manner; a second formation step of forming a burn-out portion made of a paste material containing a burn-out material, by printing, such that the burn-out portion fills the opening on the first green sheet and an end portion thereof overlaps the unfired buffer layer while protruding to the unfired gas introduction portion side which is an outer side of the opening; a lamination step of laminating the first green sheet having the burn-out portion formed thereon and a second green sheet for forming the second ceramic structure, on top of each other; and a firing step of firing a laminate obtained after the lamination step.

In a preferred embodiment (8) of the manufacturing method for manufacturing the gas sensor element according to (7) above, the unfired gas introduction portion contains a first burnable powder which is burnt out in the firing step, and the unfired buffer layer contains a second burnable powder which is burnt out in the firing step and has a larger particle size than the first burnable powder.

In a preferred embodiment (9) of the manufacturing method for manufacturing the gas sensor element according to (8) above, a content of the second burnable powder in the unfired buffer layer is lower than a content of the first burnable powder in the unfired gas introduction portion.

In another preferred embodiment (10) of the manufacturing method for manufacturing the gas sensor element according to (8) or (9) above, the second burnable powder is spherical, and the first burnable powder is irregularly shaped.

In yet another preferred embodiment (11) of the manufacturing method for manufacturing the gas sensor element according to any of (7) to (10) above, the unfired buffer layer contains zirconia as a main component, and the unfired gas introduction portion contains alumina as a main component.

In yet another preferred embodiment (12) of the manufacturing method for manufacturing the gas sensor element according to any of (7) to (11) above, in the first formation step, the unfired buffer layer is formed on the inner end portion so as not to cover an end surface, facing the opening, of the inner end portion.

Effects of the Invention

According to the present invention, it is possible to provide a gas sensor element including a gas introduction portion in which defects such as cracks are suppressed, etc.

DESCRIPTION OF REFERENCE NUMERALS

Figure 1:
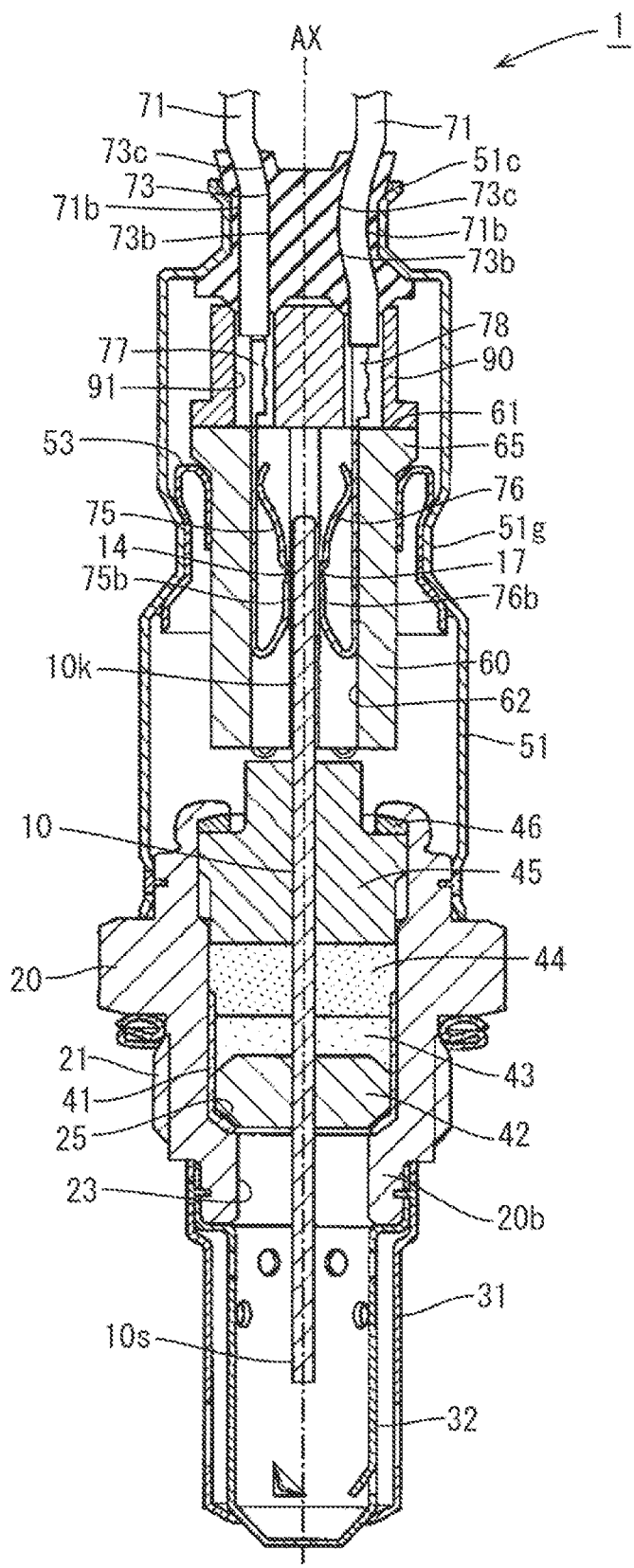
FIG. 1 is a longitudinal cross-sectional view of a gas sensor according to Embodiment 1.

Reference numerals used to identify various features in the drawings include the following.

1: gas sensor
10: gas sensor element
100A: first ceramic structure
100B: second ceramic structure
100C: third ceramic structure
110: pump cell
111*e*: second solid electrolyte body
112, 113: pump electrode 120: detection cell
121e: first solid electrolyte body
122, 123: detection electrode
141: peripheral wall portion
150a: space (main space)
150b: gap
150b1: edge on external side of gap
151b1: opposed surface
200: frame-shaped body
300: buffer layer

DETAILED DESCRIPTION OF THE PREFERRED EMBODIMENTS

The invention will next be described with reference to the drawings. However, the present invention should not be limited thereto.

Embodiment 1

Figure 2:
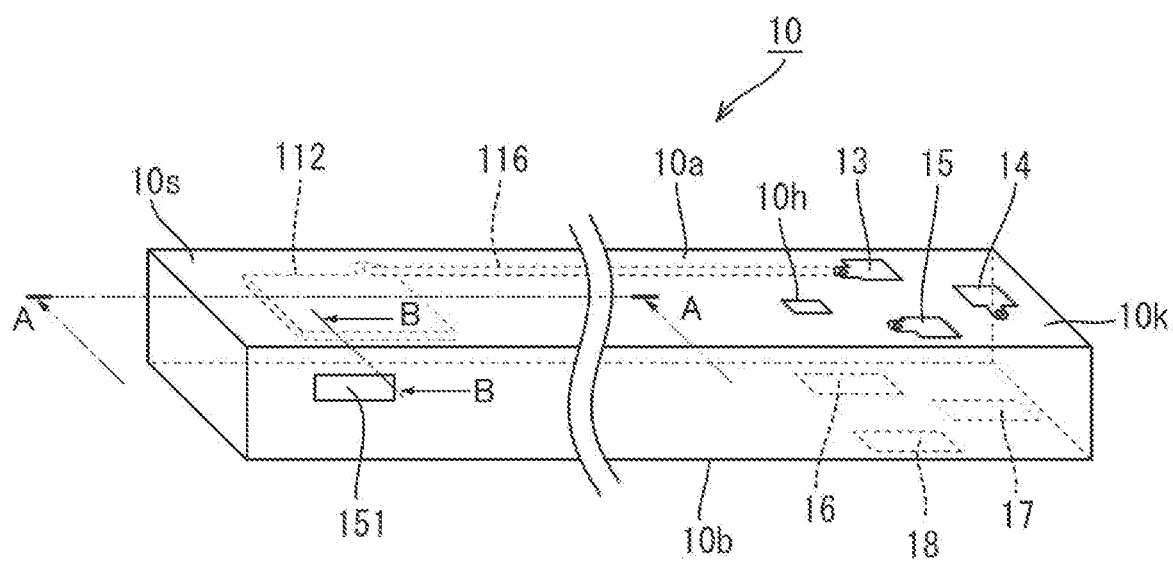
FIG. 2 is a perspective view of a gas sensor element according to Embodiment 1.
Figure 3:
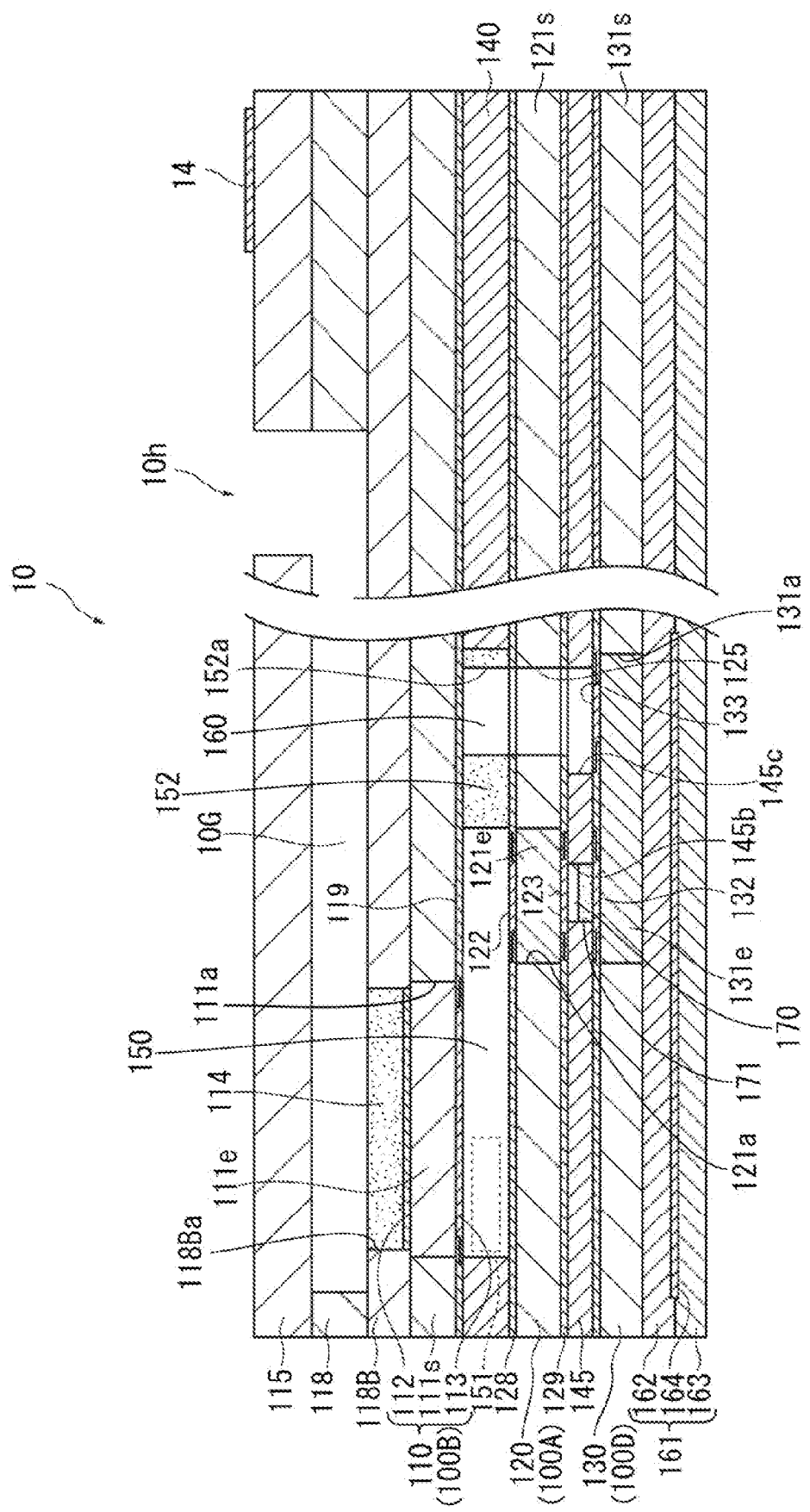
FIG. 3 is a cross-sectional view taken along a line A-A in FIG. 2.
Figure 4:
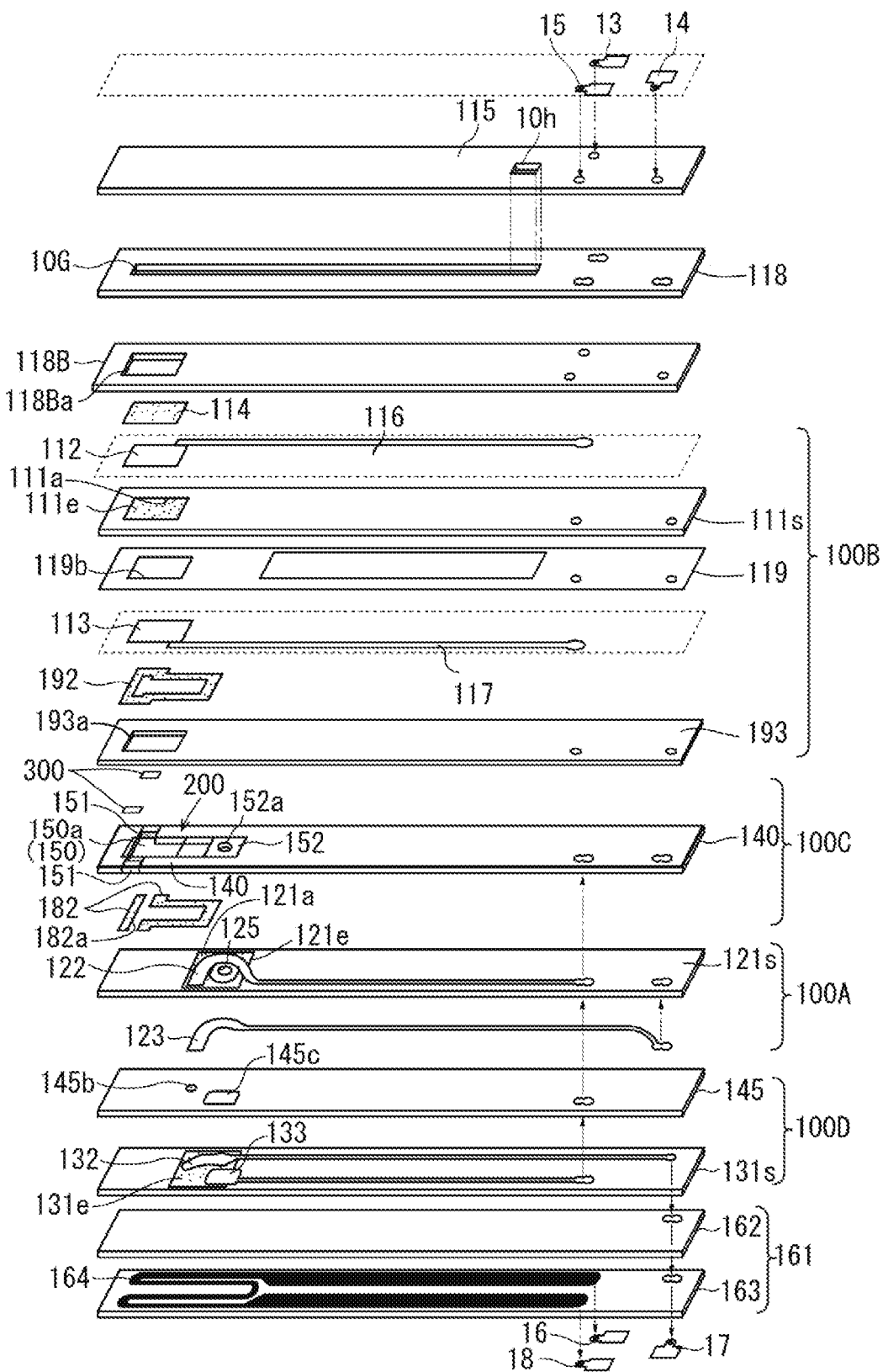
FIG. 4 is an exploded perspective view of the gas sensor element.

Hereinafter, Embodiment 1 of the present invention will be described with reference to FIG. 1 to FIG. 11. FIG. 1 is a longitudinal cross-sectional view of a gas sensor 1 according to Embodiment 1, FIG. 2 is a perspective view of a gas sensor element 10 according to Embodiment 1, FIG. 3 is a cross-sectional view taken along a line A-A in FIG. 2, and FIG. 4 is an exploded perspective view of the gas sensor element 10.

FIG. 1 shows an axial line AX of the gas sensor 1 as a straight line (alternate long and short dash line) along the up-down direction. In the present specification, a direction along the axial line AX direction of the gas sensor 1 is also referred to as a "longitudinal direction", and a direction perpendicularly intersecting the axial line AX is also referred to as a "width direction". In addition, in the present specification, the lower side of the gas sensor 1 shown in FIG. 1 is referred to as a "front end side", and the side opposite thereto (upper side in FIG. 1) is referred to as a "rear end side". Moreover, for the convenience of description, the upper side in FIG. 2 to FIG. 4 is referred to as a "front side (front surface side)" of the gas sensor element 10, and the lower side in FIG. 2 to FIG. 4 is referred to as a "rear side (rear surface side)" of the gas sensor element 10.

The gas sensor 1 includes the gas sensor element 10 capable of detecting the concentration of $NO_x$ or the like in exhaust gas which is gas to be measured (to-be-detected gas). The gas sensor 1 is mounted and used on an exhaust pipe (not shown) of an internal combustion engine, and includes a tubular metal shell 20 having a thread portion 21 which is for fixing to the exhaust pipe and is formed at a predetermined position on the outer surface thereof. The gas sensor element 10 has an elongated plate shape extending along the axial line AX direction, as a whole, and such a gas sensor element 10 is held inside the metal shell 20.

The gas sensor 1 includes: a tubular holding member 60 having an insertion hole 62 into which a rear end portion 10k of the gas sensor element 10 is inserted; and six terminal members held inside the holding member 60. In FIG. 1, for the convenience of description, only two terminal members 75 and 76 out of the six terminal members are shown.

In the rear end portion 10k of the gas sensor element 10, as shown in FIG. 2, a total of six electrode terminal portions 13 to 18 are formed so as to have a rectangular shape in a plan view. In FIG. 1, only the electrode terminal portions 14 and 17 are shown. The aforementioned terminal members are brought into elastic contact with and electrically connected to these electrode terminal portions 13 to 18, respectively. For example, an element contact portion 75b of the terminal member 75 is brought into elastic contact with and electrically connected to the electrode terminal portion 14, and an element contact portion 76b of the terminal member 76 is brought into elastic contact with and electrically connected to the electrode terminal portion 17.

Moreover, different lead wires 71 are electrically connected to the six terminal members (terminal members 75, 76, etc.), respectively. For example, as shown in FIG. 1, a core wire of a lead wire 71 is crimped and held by a lead wire holding portion 77 of the terminal member 75. In addition, a core wire of another lead wire 71 is crimped and held by a lead wire holding portion 78 of the terminal member 76.

As shown in FIG. 2, in one main surface 10a (on the front side) out of two main surfaces 10a and 10b of the rear end portion 10k of the gas sensor element 10, an opening-like atmospheric introduction port 10h is provided at a location on the front end side with respect to the electrode terminal portions 13 to 15 and on the rear end side with respect to a ceramic sleeve 45 (see FIG. 1) described below. The atmospheric introduction port 10h is located in the insertion hole 62 of the holding member 60.

The metal shell 20 is a tubular member having a through hole 23 which penetrates the metal shell 20 in the axial line AX direction. The metal shell 20 includes a shelf portion 25 which projects radially inward and forms a part of the through hole 23. The metal shell 20 holds the gas sensor element 10 inside the through hole 23 in a state where a front end portion 10s of the gas sensor element 10 projects to the outside on the front end side of the metal shell 20 (downward in FIG. 1) and the rear end portion 10k of the gas sensor element 10 projects to the outside on the rear end side of the metal shell 20 (upward in FIG. 1).

Moreover, inside the through hole 23 of the metal shell 20, an annular ceramic holder 42, two talc rings 43 and 44 formed by annularly filling with talc powder, and the ceramic sleeve 45 are disposed. More specifically, the ceramic holder 42, the talc rings 43 and 44, and the ceramic sleeve 45 are laminated in this order from the front end side to the rear end side of the metal shell 20 so as to surround the gas sensor element 10 which extends in the axial line AX.

A metal cup 41 is disposed between the ceramic holder 42 and the shelf portion 25 of the metal shell 20. In addition, a crimp ring 46 is disposed between the ceramic sleeve 45 and a crimp portion 22 of the metal shell 20. The crimp portion 22 of the metal shell 20 is crimped such that the ceramic sleeve 45 is pressed on the front end side via the crimp ring 46.

An outer protector 31 and an inner protector 32 each made of metal (for example, stainless steel) and having a plurality of holes are attached to a front end portion 20b of the metal shell 20 by welding so as to cover the front end portion 10s of the gas sensor element 10. In addition, an outer casing 51 is attached to a rear end portion of the metal shell 20 by welding. The outer casing 51 has a tubular shape extending in the axial line AX direction, as a whole, and surrounds the gas sensor element 10.

The holding member 60 is a tubular member made of an insulating material (for example, alumina) and having the insertion hole 62 which penetrates the member in the axial line AX direction. The above-described six terminal members (terminal members 75 and 76, etc.) are disposed inside the insertion hole 62 (see FIG. 1). A flange portion 65 is formed at a rear end portion of the holding member 60 so as to project radially outward. The holding member 60 is held by an inner support member 53 such that the flange portion 65 is in contact with the inner support member 53. The inner support member 53 is held by a crimp portion 51g, of the outer casing 51, which is crimped toward the radially inner side.

An insulating member 90 is disposed on a rear end surface 61 of the holding member 60. The insulating member 90 is made of an insulating material (for example, alumina), and has an annular shape as a whole. In the insulating member 90, a total of six through holes 91 are formed so as to penetrate the insulating member 90 in the axial line AX direction. The lead wire holding portions 77, 78, etc., of the above-described terminal members are disposed in the through holes 91.

Moreover, in the outer casing 51, an elastic seal member 73 made of a fluororubber is disposed on the radially inner side of a rear end opening 51c located on the rear end side. In the elastic seal member 73, a total of six cylindrical insertion holes 73c are formed so as to extend in the axial line AX direction. Each insertion hole 73c is formed by an insertion hole surface 73b (cylindrical inner wall surface) of the elastic seal member 73. One lead wire 71 is inserted into each insertion hole 73c. Each lead wire 71 extends to the outside of the gas sensor 1 through the insertion hole 73c of the elastic seal member 73. The elastic seal member 73 is elastically compressed and deformed in the radial direction by radially inwardly crimping the rear end opening 51c of the outer casing 51, whereby the insertion hole surface 73b and an outer circumferential surface 71b of the lead wire 71 are brought into close contact with each other to be sealed in a watertight manner.

As shown in FIG. 3, the gas sensor element 10 has a structure in which a plurality of plate-shaped ceramic structures are laminated. Such a gas sensor element 10 includes plate-shaped insulating layers 111s, 121s, and 131s, solid electrolyte bodies 111e, 121e, and 131e formed in the plate-shaped insulating layers 111s, 121s, and 131s, and insulators 140 and 145 disposed between the plate-shaped insulating layers 111s, 121s, and 131s. The gas sensor element 10 further includes a heater 161 disposed on the rear surface side of the solid electrolyte body 131e. The heater 161 includes two plate-shaped insulators 162 and 163 mainly made of alumina, and a heater pattern 164 embedded between the insulators 162 and 163. The heater pattern 164 is composed of a film-shaped pattern mainly made of platinum (Pt).

Each of the solid electrolyte bodies 111e, 121e, and 131e has a substantially rectangular shape in a plan view. The solid electrolyte body 111e is formed so as to overlap an opening 111a provided on the front end side (left side in FIG. 4) in the plate-shaped insulating layer 111s which extends in the axial line AX direction. The solid electrolyte body 121e is formed so as to overlap an opening 121a provided on the front end side (left side in FIG. 4) in the plate-shaped insulating layer 121s which extends in the axial line AX direction. The solid electrolyte body 131e is formed so as to overlap an opening 131a provided on the front end side (left side in FIG. 4) in the plate-shaped insulating layer 131s which extends in the axial line AX direction. The solid electrolyte bodies 111e, 121e, and 131e may be formed so as to be embedded in the corresponding openings 111a, 121a, and 131a, respectively, or may be formed by transferring separately prepared sheet-shaped members to predetermined locations.

The solid electrolyte bodies 111e, 121e, and 131e are made of zirconia which is a solid electrolyte, and have oxygen ion conductivity. A porous Ip1+ electrode 112 is provided on the front surface side of the solid electrolyte body 111e. In addition, a porous Ip1− electrode 113 is provided on the rear surface side of the solid electrolyte body 111e. Furthermore, the front surface of the Ip1+ electrode 112 is covered with a porous layer 114. An Ip1+ lead 116 is connected to the Ip1+ electrode 112. In addition, an Ip1− lead 117 is connected to the Ip1− electrode 113. The Ip1+ electrode 112 and the Ip1− electrode 113 correspond to a pair of pump electrodes 112 and 113 of the present invention.

As shown in FIG. 4, a plate-shaped dense layer 118B extending in the axial line AX direction is laminated on the respective front surfaces of the Ip1+ electrode 112 and the Ip1+ lead 116. The dense layer 118B is made of a gas-impermeable material such as alumina. An opening 118Ba having a rectangular shape in a plan view is provided on the front end side of the dense layer 118B. The above-described porous layer 114 is formed so as to fill the opening 118Ba.

As shown in FIG. 4, a gas-impermeable dense layer 118 including a void 10G and made of alumina or the like is disposed on the front surface side of the dense layer 118B. The void 10G is formed inside a groove extending in the longitudinal direction (axial line AX direction). A part of the porous layer 114 is exposed from the void 10G. In the plate-shaped dense layer 118 which extends in the axial line AX direction, the void 10G extends straight from a portion near the porous layer 114 to a portion connected to the atmospheric introduction port 10h. In the plate-shaped dense layer 118 which extends in the axial line AX direction, through holes for electrical conduction with the electrode terminal portions 13, 14, and 15 are provided on the rear end side.

A gas-impermeable dense layer 115 made of alumina or the like is laminated on the front surface of the dense layer 118. When the dense layer 115 is laminated as described above, the void 10G is closed by the dense layer 115.

In the dense layer 115, the atmospheric introduction port 10h is formed at a position overlapping the rear end of the void 10G which extends in the longitudinal direction (axial line AX direction). The atmospheric introduction port 10h is composed of an opening provided so as to penetrate the dense layer 115 in the thickness direction. Such an atmospheric introduction port 10h is connected to the void 10G. The atmospheric introduction port 10h is open on the rear end side with respect to the ceramic sleeve 45, and, rather than exhaust gas, atmospheric air can be introduced therethrough. Accordingly, the Ip1+ electrode 112 is exposed to the atmospheric air introduced from the atmospheric introduction port 10h via the porous layer 114.

The solid electrolyte body 111e, the Ip1+ electrode 112, and the Ip1− electrode 113 form an Ip1 cell (pump cell) 110 (see FIG. 3). According to a pump current Ip1 (first pump current) applied between the Ip1+ electrode 112 and the Ip1− electrode 113, the Ip1 cell 110 pumps out and pumps in oxygen (so called "oxygen pumping") between the atmosphere (atmospheric air in the void 10G) which contacts the Ip1+ electrode 112 and the atmosphere (atmosphere in a first measurement chamber 150 described below, that is, gas to be measured which is outside the gas sensor element 10) which contacts the Ip1− electrode 113. In the present specification, a plate-shaped portion including the Ip1 cell 110, the insulating layer 111s, etc., is referred to as a "second ceramic structure 100B".

A porous Vs− electrode 122 is provided on the front surface side of the solid electrolyte body 121e. In addition, a porous Vs+ electrode 123 is provided on the rear surface side of the solid electrolyte body 121e. The Vs− electrode 122 and the Vs+ electrode 123 correspond to a pair of detection electrodes 122 and 123 of the present invention.

The first measurement chamber 150 is formed between the solid electrolyte body 111e and the solid electrolyte body 121e in the lamination direction. The first measurement chamber 150 is composed of an inner space, in the gas sensor element 10, into which gas to be measured (exhaust gas) flowing in an exhaust passage in the exhaust pipe is first introduced, and communicates with the outside of the gas sensor element 10 through gas-permeable and water-permeable first porous bodies (diffusion resistance portions) 151 (see FIG. 2 and FIG. 4). Each first porous body 151 is provided on the lateral side of the first measurement chamber 150 as a partition to the outside of the gas sensor element 10. Such first porous bodies 151 limit the flowing amount per unit time (diffusion rate) of the exhaust gas into the first measurement chamber 150.

A second porous body 152 which limits the flowing amount per unit time of the exhaust gas is provided on the rear end side of the first measurement chamber 150 (right side in FIG. 3) as a partition between the first measurement chamber 150 and a second measurement chamber 160 described below.

The solid electrolyte body 121e, the Vs− electrode 122, and the Vs+ electrode 123 form a Vs cell (detection cell) 120. The Vs cell 120 generates an electromotive force mainly according to the difference in oxygen partial pressure between the atmospheres separated by the solid electrolyte body 121e (the atmosphere in the first measurement chamber 150 contacting the Vs− electrode 122 and the atmosphere in a reference oxygen chamber 170 contacting the Vs+ electrode 123). In the present specification, a plate-shaped portion including the Vs cell 120, the insulating layer 121s, etc., is referred to as a "first ceramic structure 100A".

A porous Ip2+ electrode 132 and a porous Ip2− electrode 133 are provided on the front surface side of the solid electrolyte body 131e.

The reference oxygen chamber 170 is formed as an isolated small space between the Ip2+ electrode 132 and the Vs+ electrode 123. The reference oxygen chamber 170 is formed by an opening 145b formed in the insulator 145. In the reference oxygen chamber 170, a porous body 171 made of ceramic is disposed on the Ip2+ electrode 132 side (see FIG. 3).

Moreover, the second measurement chamber 160 is formed at a position opposed to the Ip2− electrode 133 in the lamination direction. The second measurement chamber 160 is mainly composed of an opening 145c which penetrates the insulator 145 in the lamination direction (thickness direction), an opening 125 which penetrates the insulating layer 121s in the lamination direction (thickness direction), and an opening 152a which penetrates the second porous body 152 in the lamination direction (thickness direction).

The first measurement chamber 150 and the second measurement chamber 160 communicate with each other via the gas-permeable and water-permeable second porous body 152. Therefore, the second measurement chamber 160 communicates with the outside of the gas sensor element 10 through the first porous bodies 151, the first measurement chamber 150, and the second porous body 152.

The solid electrolyte body 131e, the Ip2+ electrode 132, and the Ip2− electrode 133 form an Ip2 cell 130 (second pump cell) for detecting an $NO_x$ concentration. The Ip2 cell 130 moves oxygen (oxygen ions) derived from $NO_x$ decomposed in the second measurement chamber 160, to the reference oxygen chamber 170 through the solid electrolyte body 131e. At that time, a current (second pump current) flows between the Ip2+ electrode 132 and the Ip2− electrode 133 according to the concentration of $NO_x$ contained in the exhaust gas (gas to be measured) introduced into the second measurement chamber 160. In the present specification, a plate-shaped portion including the Ip2 cell 130, the insulating layer 131s, etc., is also referred to as a "fourth ceramic structure 100D".

Moreover, in the present specification, a plate-shaped portion disposed between the first ceramic structure 100A and the second ceramic structure 100B is referred to as a "third ceramic structure 100C". The third ceramic structure 100C will be described in detail below.

In the present embodiment, an alumina insulating layer 119 is formed on a portion other than the Ip1− electrode 113, etc., of the rear surface of the insulating layer 111s. The Ip1− electrode 113 is in contact with the solid electrolyte body 111e through a through hole 119b (see FIG. 4) which penetrates the alumina insulating layer 119 in the lamination direction. The alumina insulating layer 119 forms a part of the second ceramic structure 100B.

Moreover, an alumina insulating layer 128 (see FIG. 3) is formed on a portion other than the Vs− electrode 122, etc., of the front surface of the insulating layer 121s. In FIG. 4, for the convenience of description, the alumina insulating layer 128 is not shown. The Vs− electrode 122 is in contact with the solid electrolyte body 121e through a through hole (not shown) which penetrates the alumina insulating layer 128 in the lamination direction. The alumina insulating layer 128 forms a part of the first ceramic structure 100A.

Moreover, an alumina insulating layer 129 (see FIG. 3) is formed on a portion other than the Vs+ electrode 123, etc., of the rear surface of the insulating layer 121s. In FIG. 4, for the convenience of description, the alumina insulating layer 129 is not shown. The Vs+ electrode 123 is in contact with the solid electrolyte body 121e through a through hole (not shown) which penetrates the alumina insulating layer 129 in the lamination direction. The alumina insulating layer 129 forms a part of the first ceramic structure 100A.

Moreover, an alumina insulating layer 138 (see FIG. 3) is formed on a portion other than the Ip2+ electrode 132, the Ip2− electrode 133, etc., of the front surface of the insulating layer 131s. In FIG. 4, for the convenience of description, the alumina insulating layer 138 is not shown. The Ip2+ electrode 132 and the Ip2− electrode 133 are in contact with the solid electrolyte body 131e through a through hole (not shown) which penetrates the alumina insulating layer 138 in the lamination direction. The alumina insulating layer 138 forms a part of the fourth ceramic structure 100D.

Figure 5:
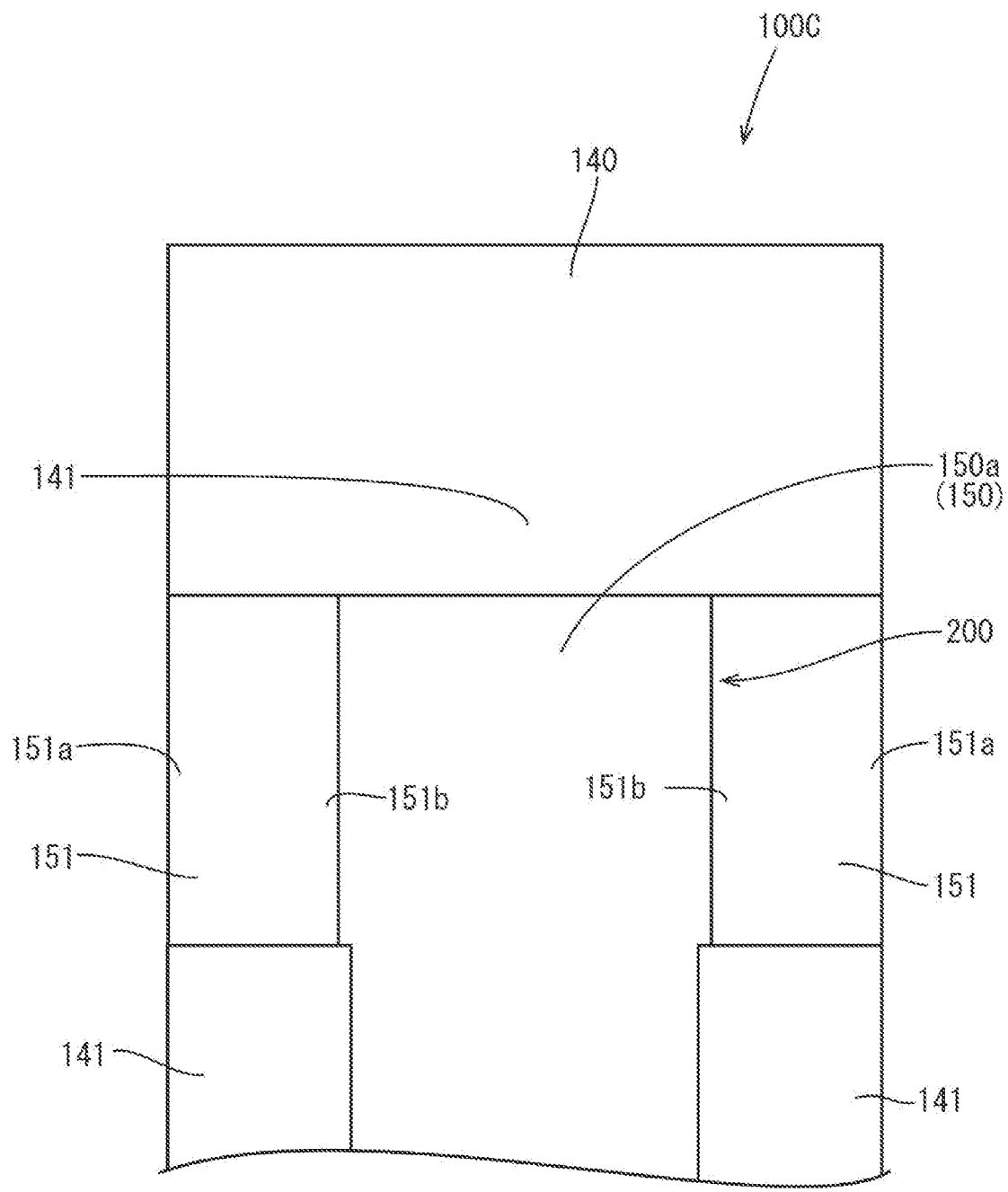
FIG. 5 is an enlarged plan view of an area around a frame-shaped body of a third ceramic structure.

Here, the third ceramic structure 100C will be described with reference to FIG. 5, etc. FIG. 5 is an enlarged plan view of an area around a frame-shaped body 200 of the third ceramic structure 100C. The upper side in FIG. 5 corresponds to the front end side of the gas sensor element 10, and the lower side in FIG. 5 corresponds to the rear end side of the gas sensor element 10. The third ceramic structure 100C is a layer-shaped ceramic structure having a frame-shaped body 200 which surrounds a space 150a formed between the first ceramic structure 100A and the second ceramic structure 100B. Such a third ceramic structure 100C mainly includes the layer-shaped (plate-shaped) insulator 140, the two first porous bodies (gas introduction portions) 151, and the second porous body 152 (see FIG. 4). The insulator 140 is made of a dense ceramic (for example, alumina). The space 150a is formed between the first ceramic structure 100A and the second ceramic structure 100B and is composed of a space (main space) which is a major part of the first measurement chamber 150.

The frame-shaped body 200 includes the two first porous bodies (gas introduction portions) 151, the second porous body 152, and peripheral wall portions 141 which surround the space 150a together with the two first porous bodies (gas introduction portions) 151 and the second porous body 152. The peripheral wall portions 141 is composed of portions, of the insulator 140, which face the space 150a.

As shown in FIG. 5, a pair of the (two) first porous bodies (gas introduction portions) 151 are disposed so as to be opposed to each other with the space 150a therebetween in the width direction of the third ceramic structure 100C (right-left direction).

Each of the first porous bodies (gas introduction portions) 151 has one end portion 151a disposed on the external side, and another end portion 151b disposed on the space 150a side. Each of such first porous bodies (gas introduction portions) 151 is made of a porous ceramic which allows external gas to be measured (to-be-detected gas) to be introduced into the space 150a while allowing the external gas to pass from the one end portion 151a side to the other end portion 151b side.

As shown in FIG. 5, the peripheral wall portions 141 are disposed so as to surround the space 150a together with these first porous bodies (gas introduction portions) 151, etc.

Figure 6:
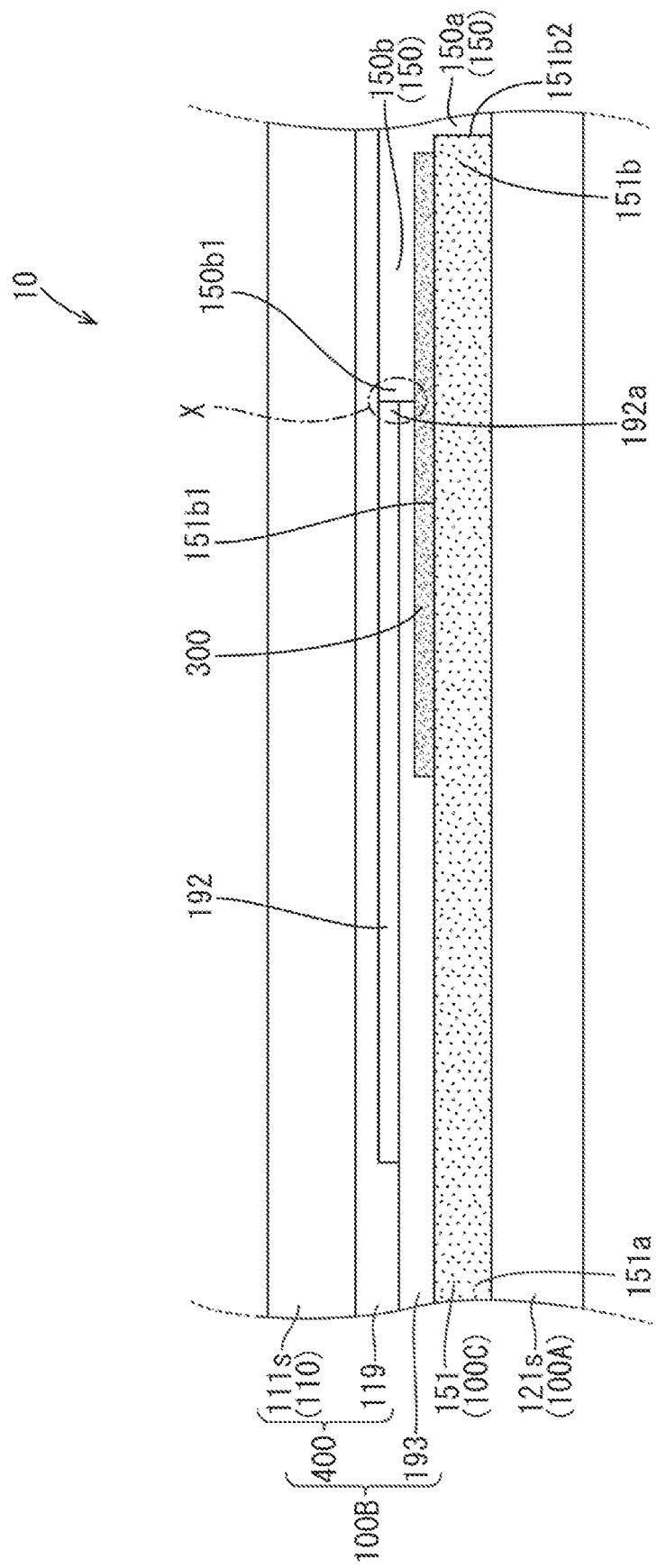
FIG. 6 is a cross-sectional view taken along a line B-B in FIG. 2.

FIG. 6 is a cross-sectional view taken along a line B-B in FIG. 2. In FIG. 6, for the convenience of description, the cross-sectional configuration around the first porous body (gas introduction portion) 151 of the third ceramic structure 100C which is disposed between the first ceramic structure 100A and the second ceramic structure 100B in the gas sensor element 10 is shown.

As shown in FIG. 6, a gap 150b connected to the space 150a is formed between an opposed surface 151b1, opposed to the second ceramic structure 100B, of the other end portion 151b of the first porous body (gas introduction portion) 151 and the second ceramic structure 100B. The gap 150b is a part of the first measurement chamber 150. In addition, the gap 150b is formed between each of the two first porous bodies (gas introduction portions) 151 and the second ceramic structure 100B (that is, two gaps 150b are formed).

A buffer layer 300 is formed so as to overlap a boundary portion X between an edge 150b1 on the external side of the gap 150b and the second ceramic structure 100B when the gas sensor element 10 is viewed in the lamination direction. The buffer layer 300 is made of a ceramic composed of a material having a lower shrinkage start temperature than the material for forming the first porous bodies (gas introduction portions) 151.

In the present specification, the "shrinkage start temperature" refers to a temperature at which a shrinkage factor becomes 1.05 when a green sheet of the same composition as each ceramic layer (for example, the buffer layer 300, the first porous bodies 151) is prepared and the temperature thereof is increased in the air atmosphere to advance firing to form the ceramic layer. The shrinkage factor is also called a firing shrinkage rate, and is calculated as the length or width dimension of the green sheet before firing when the length or width dimension of the ceramic layer after firing is set to 1.

That is, shrinkage factor=(length or width dimension of green sheet before firing)/(dimension in the same direction of ceramic layer after firing).

The buffer layer 300 is formed by printing as described below. Since the gas sensor element 10 of the present embodiment includes such buffer layers 300, the occurrence of defects such as cracks in the first porous bodies (gas introduction portions) 151 during the manufacturing of the gas sensor element 10 is suppressed.

Each buffer layer 300 is made of a porous ceramic containing pores larger than the pores contained in each first porous body (gas introduction portion) 151. Therefore, the flowing amount per unit time (diffusion rate) of the gas to be measured (to-be-detected gas) when the gas moves inside the first porous body (gas introduction portion) 151 is inhibited from being influenced and reduced by the buffer layer 300.

The material for forming the buffer layer 300 contains zirconia as a main component, and the material for forming the first porous body (gas introduction portion) 151 contains alumina as a main component. In the present specification, the "main component" is contained in an amount that is not less than 50 mass % of all constituent components. That is, in the present embodiment, the buffer layer 300 contains 50 mass % or more of zirconia, and the first porous body (gas introduction portion) 151 contains 50 mass % or more of alumina.

Moreover, as shown in FIG. 6, the buffer layer 300 is formed on the opposed surface 151b1 so as not to cover an end surface 151b2, facing the space 150a, of the other end portion 151b of the first porous body (gas introduction portion) 151. Therefore, the flowing amount per unit time (diffusion rate) of the gas to be measured (to-be-detected gas) when the gas moves inside the first porous body (gas introduction portion) 151 is inhibited from being influenced and reduced by the buffer layer 300.

In the present embodiment, as shown in FIG. 6, the second ceramic structure 100B includes: a plate-shaped body portion 400 which includes the Ip1 cell (pump cell) 110, the alumina insulating layer 119, etc.; and an adhesive layer 193 which is disposed between the plate-shaped body portion 400 and the third ceramic structure 100C and is composed of a layer of a dense ceramic. The second ceramic structure 100B further includes a reinforcing layer 192 which is disposed between the plate-shaped body portion 400 and the adhesive layer 193 and is shaped so as to surround the space 150a when viewed in the lamination direction (see FIG. 4). The adhesive layer 193 has a layer shape (plate shape) as a whole. In the adhesive layer 193, an opening 193a is formed at a location overlapping the first measurement chamber 150 (main space 150a) in plan view, so as to penetrate the adhesive layer 193 in the thickness direction.

As shown in FIG. 6, an inner peripheral edge 192a of the reinforcing layer 192 is located on the outer side with respect to the end surface 151b2 of the first porous body (gas introduction portion) 151, and is in contact with the edge 150b1 on the external side of the gap 150b. The inner peripheral edge 192a of the reinforcing layer 192 is not in direct contact with the buffer layer 300. The reinforcing layer 192 is laminated on the third ceramic structure 100C via the adhesive layer 193. The adhesive layer 193 is made of, for example, a dense ceramic (for example, alumina). The reinforcing layer 192 is made of, for example, a ceramic containing zirconia as a main component.

Moreover, as shown in FIG. 4, the third ceramic structure 100C of the present embodiment includes a reinforcing layer 182 which is disposed between the frame-shaped body 200 and the insulating layer 121s of the first ceramic structure 100A and is shaped so as to surround the space 150a when viewed in the lamination direction. In the reinforcing layer 182, a cutout 182a is provided so as not to be in direct contact with the first porous bodies (gas introduction portions) 151 in the frame-shaped body 200. Similar to the reinforcing layer 192, the reinforcing layer 182 is made of, for example, a ceramic containing zirconia as a main component.

The reinforcing layer 192 and the reinforcing layer 182 may be made of the same material as the above-described buffer layer 300, as long as the object of the present invention is not impaired.

Here, a method for detecting an $NO_x$ concentration by the gas sensor 1 of the present embodiment will be briefly described. The solid electrolyte bodies 111e, 121e, and 131e of the gas sensor element 10 are heated and activated as the temperate of the heater pattern 164 is increased. Accordingly, the Ip1 cell 110, the Vs cell 120, and the Ip2 cell 130 operate individually.

The exhaust gas flowing through the exhaust passage (not shown) in the exhaust pipe is introduced into the first measurement chamber 150 while the flowing amount thereof is being limited by each first porous body 151. At this time, a weak current (micro current) Icp is applied to the Vs cell 120 so as to flow from the Vs+ electrode 123 side to the Vs− electrode 122 side. Therefore, oxygen in the exhaust gas receives electrons from the Vs− electrode 122 in the first measurement chamber 150, which is the negative electrode side, flows in the solid electrolyte body 121e as oxygen ions, and moves into the reference oxygen chamber 170. That is, by applying the current Icp between the Vs− electrode 122 and the Vs+ electrode 123, the oxygen in the first measurement chamber 150 is moved into the reference oxygen chamber 170.

If the oxygen concentration of the exhaust gas introduced into the first measurement chamber 150 is lower than a predetermined value, a current Ip1 is applied to the Ip1 cell 110 such that the Ip1+ electrode 112 becomes a negative electrode, and oxygen is pumped from the outside of the gas sensor element 10 into the first measurement chamber 150.

On the other hand, if the oxygen concentration of the exhaust gas introduced into the first measurement chamber 150 is higher than the predetermined value, the current Ip1 is applied to the Ip1 cell 110 such that the Ip1− electrode 113 becomes a negative electrode, and oxygen is pumped from the inside of the first measurement chamber 150 to the outside of the gas sensor element 10.

The exhaust gas whose oxygen concentration has been adjusted in the first measurement chamber 150 as described above is introduced into the second measurement chamber 160 through the second porous body 152. NO in the exhaust gas which contacts the Ip2− electrode 133 in the second measurement chamber 160 is decomposed (reduced) to nitrogen and oxygen on the Ip2− electrode 133 by a voltage Vp2 being applied between the Ip2+ electrode 132 and the Ip2− electrode 133, and the oxygen resulting from the decomposition flows in the solid electrolyte body 131e as oxygen ions and moves into the reference oxygen chamber 170. At this time, the residual oxygen left in the first measurement chamber 150 without being pumped out is similarly moved into the reference oxygen chamber 170 by the Ip2 cell 130. Accordingly, a current based on $NO_x$ and a current based on the residual oxygen flow through the Ip2 cell 130. The oxygen that has moved into the reference oxygen chamber 170 is released to the outside (atmospheric air) via the Vs+ electrode 123 and a Vs+ lead and the Ip2+ electrode 132 and an Ip2+ lead, which are in contact with the inside of the reference oxygen chamber 170. For this reason, the Vs+ lead and the Ip2+ lead are made porous.

Since the concentration of the residual oxygen left in the first measurement chamber 150 without being pumped out is adjusted to the predetermined value as described above, the current based on the residual oxygen is considered to be substantially constant. That is, the current based on the residual oxygen has little effect on the variation of the current based on $NO_x$, and the current (second pump current) flowing through the Ip2 cell 130 is proportional to the $NO_x$ concentration. Therefore, a current Ip2 (second pump current) flowing through the Ip2 cell 130 is measured, and the NO concentration of the exhaust gas is detected on the basis of the current value thereof.

Figure 7:
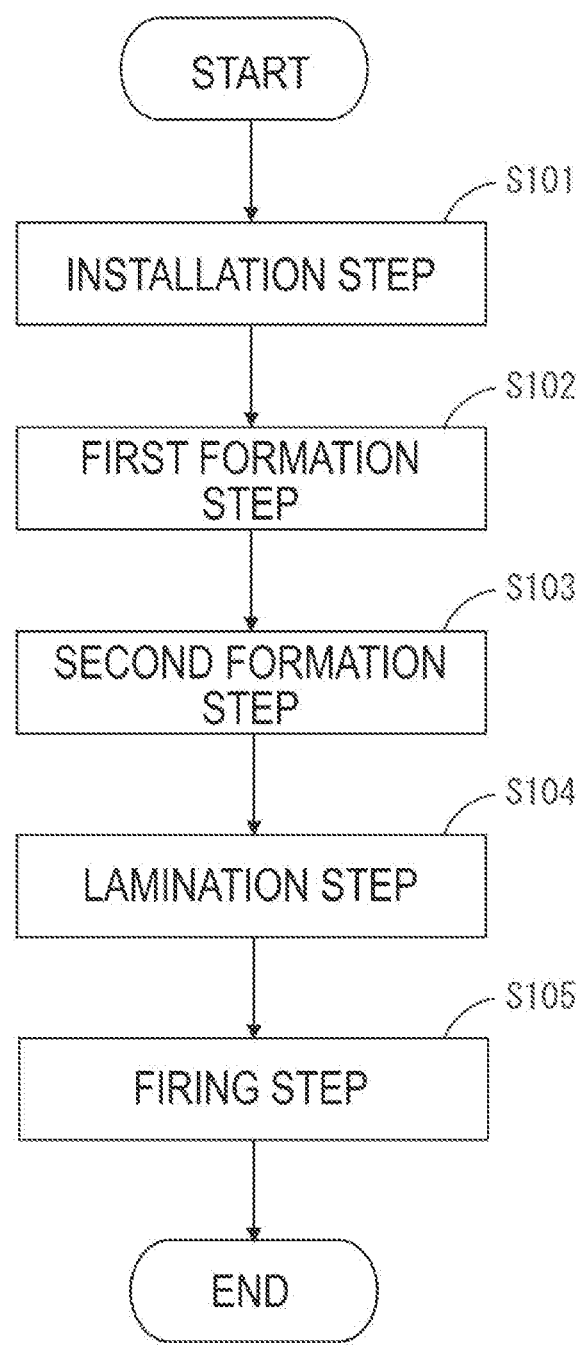
FIG. 7 is a flowchart showing each step in a manufacturing method for the gas sensor element.

Next, a manufacturing method for the above-described gas sensor element 10 will be described with reference to FIG. 7 to FIG. 11, etc. FIG. 7 is a flowchart showing each step in the manufacturing method for manufacturing the gas sensor element. As shown in FIG. 7, the manufacturing method for the gas sensor element of the present embodiment includes an installation step S101, a first formation step S102, a second formation step S103, a lamination step S104, and a firing step S105.

Figure 8:
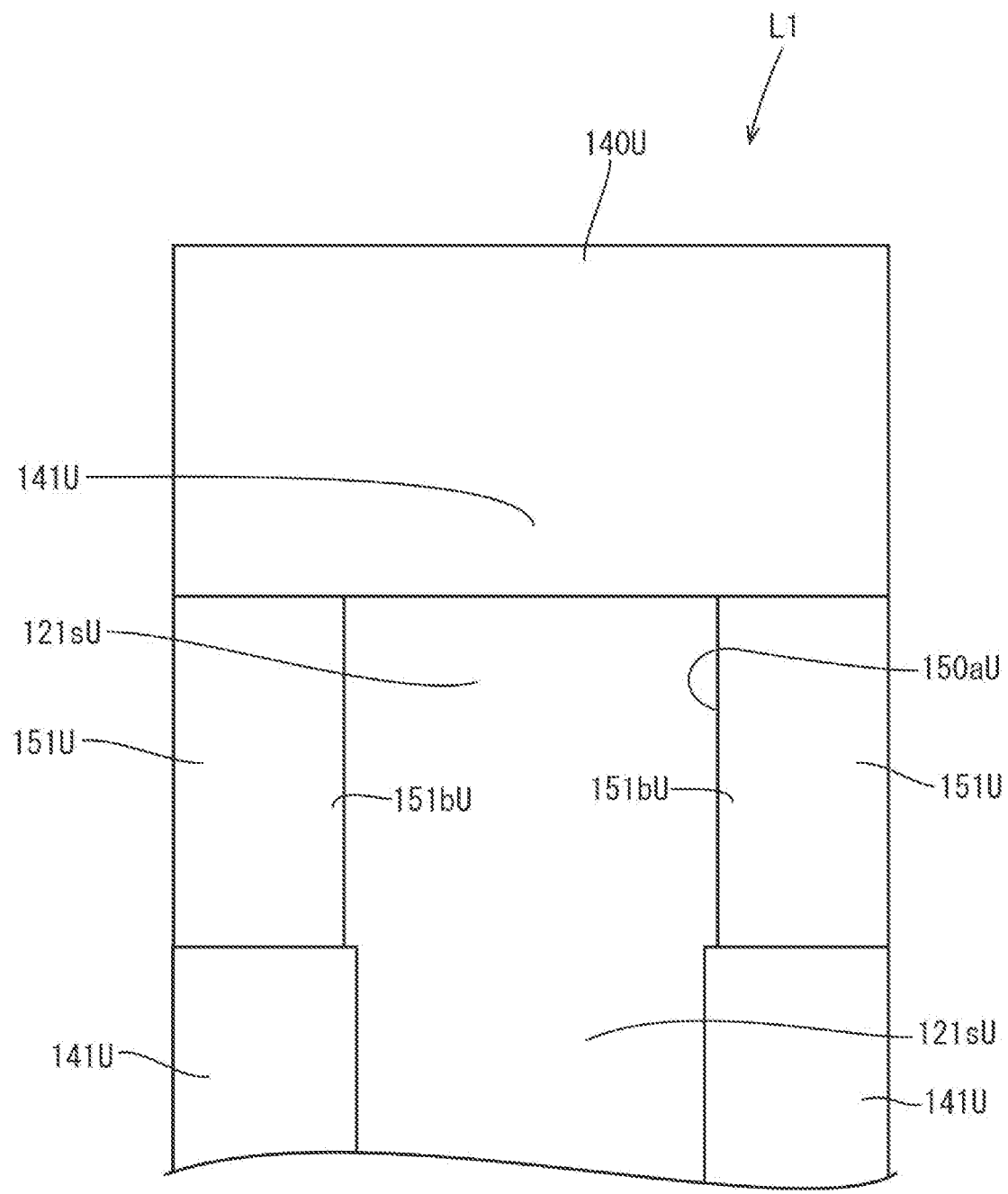
FIG. 8 is a plan view showing a part of a first laminate obtained in an installation step.

The installation step S101 is a step in which unfired gas introduction portions 151U made of the material for forming the first porous bodies (gas introduction portions) 151 and unfired peripheral wall portions 141U made of the material for forming the peripheral wall portions 141 are installed on a first green sheet 121sU for forming the first ceramic structure 100A, and an opening 150aU corresponding to the space 150a is formed on the inner side of the unfired gas introduction portions 151U and the unfired peripheral wall portions 141U. FIG. 8 is a plan view showing a part of a first laminate L1 obtained in the installation step S101.

The first green sheet 121sU is used for forming the insulating layer 121s of the first ceramic structure 100A. The unfired peripheral wall portions 141U are formed on the front surface of such a first green sheet 121sU by printing. The unfired peripheral wall portions 141U are composed of parts of an unfired insulator 140U made of the material for forming the insulator 140. The unfired peripheral wall portions 141U (unfired insulator 140U) contain alumina as a main component.

The unfired gas introduction portions 151U contain alumina as a main component and also contain a first burnable powder (for example, carbon powder) which is burnt out in the firing step S105 described below. The shape of the first burnable powder is preferably not a spherical shape but an irregular shape.

The unfired gas introduction portions 151U of the present embodiment are formed on a separately prepared support sheet in a peelable state in advance. The unfired gas introduction portions 151U on the sheet are transferred to predetermined locations on the first green sheet 121sU (cutouts formed in the unfired insulator 140U), whereby the unfired gas introduction portions 151U are formed at the predetermined locations on the first green sheet 121sU. In another embodiment, the unfired gas introduction portions 151U may be formed by printing.

In the first laminate L1, members made of various materials for forming the solid electrolyte body 121e, the Vs− electrode 122, etc., are laminated as appropriate.

Figure 9:
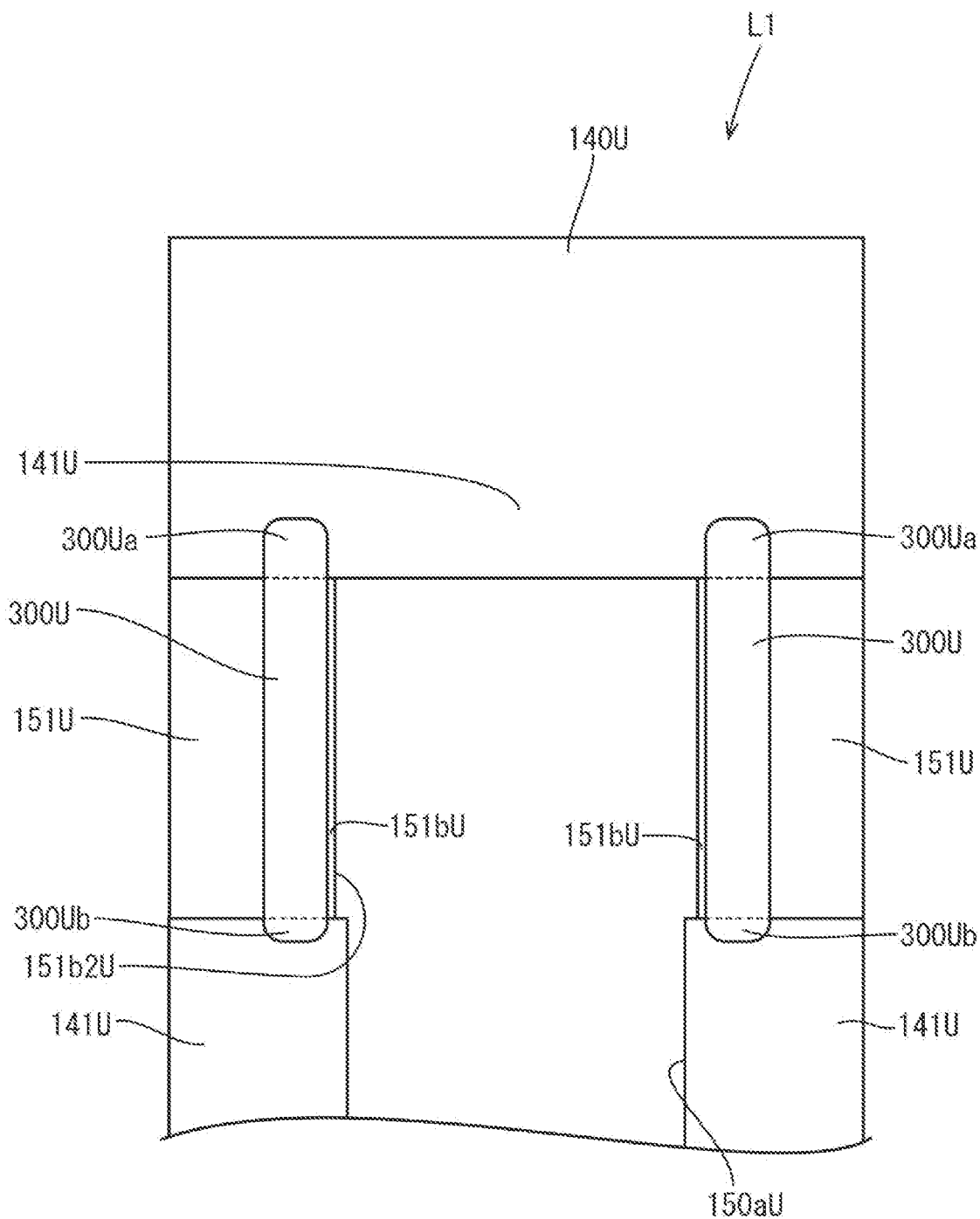
FIG. 9 is a plan view showing a part of the first laminate in a state where unfired buffer layers are formed on inner end portions of unfired gas introduction portions in a first formation step.

The first formation step S102 is a step in which unfired buffer layers 300U made of a material having a lower shrinkage start temperature than the unfired gas introduction portions 151U are formed on inner end portions 151bU, corresponding to the other end portions 151b, disposed on the opening 150aU side of the unfired gas introduction portions 151U, in an overlapping manner. FIG. 9 is a plan view showing a part of the first laminate L1 in a state where the unfired buffer layers 300U are formed on the inner end portions 151*b*U of the unfired gas introduction portions 151U in the first formation step S102.

As described above, the unfired buffer layers 300U are made of a material having a lower shrinkage start temperature than the unfired gas introduction portions 151U. An example of such an unfired buffer layer 300U is a layer that contains zirconia as a main component and also contains a second burnable powder (for example, carbon powder) which is burnt out in the firing step S105 described below.

As the second burnable powder, powder having a larger particle size than the first burnable powder is preferably used. When the particle size of the second burnable powder is larger than that of the first burnable powder as described above, it is easier to adjust the shrinkage start temperature of the unfired buffer layers 300U to be lower than that of the unfired gas introduction portions 151U. Also, the flowing amounts (diffusion rates) of gas in the first porous bodies (gas introduction portions) 151 are inhibited from being reduced by the finally obtained buffer layers 300.

Moreover, the content of the second burnable powder in each unfired buffer layer 300U is preferably lower than the content of the first burnable powder in each unfired gas introduction portion 151U. When the content of the second burnable powder in each unfired buffer layer 300U is lower as described above, it is easier to adjust the shrinkage start temperature of the unfired buffer layers 300U to be lower than that of the unfired gas introduction portions 151U. Also, the flowing amounts (diffusion rates) of gas in the first porous bodies (gas introduction portions) 151 are inhibited from being reduced by the finally obtained buffer layers 300.

Moreover, the second burnable powder is preferably spherical. When the second burnable powder is spherical, the finally obtained buffer layers 300 do not have a structure that allows gas to diffuse easily, so that the flowing amounts (diffusion rates) of gas in the first porous bodies (gas introduction portions) 151 are inhibited from being reduced.

In the first formation step S102, the unfired buffer layers 300U are formed on the inner end portions 151*b*U so as not to cover end surfaces 151*b*2U, facing the opening 150*a*U, of the inner end portions 151*b*U. Therefore, the flowing amounts (diffusion rates) of gas in the first porous bodies (gas introduction portions) 151 are inhibited from being reduced by the finally obtained buffer layers 300.

As shown in FIG. 9, the unfired buffer layers 300U each have a shape elongated in the front-rear direction (longitudinal direction) of the gas sensor element 10. The unfired buffer layers 300U are formed by printing using a printing device. In consideration of printing misalignment, etc., end portions 300Ua on the front side (upper side in FIG. 9) of the unfired buffer layers 300U are formed on the unfired peripheral wall portions 141U located on the front side with respect to the unfired gas introduction portions 151U. In addition, end portions 300Ub on the rear side (lower side in FIG. 9) of the unfired buffer layers 300U are formed on the unfired peripheral wall portions 141U located on the rear side with respect to the unfired gas introduction portions 151U.

The second formation step S103 is a step in which a burn-out portion 500U made of a paste material (for example, carbon paste) containing a burn-out material (for example, carbon powder) is formed by printing so as to fill the opening 150*a*U on the first green sheet 121*s*U and such that each end portion 501U thereof overlaps the unfired buffer layer 300U while protruding to the unfired gas introduction portion 151U side which is the outer side of the opening 150*a*U.

Figure 10:
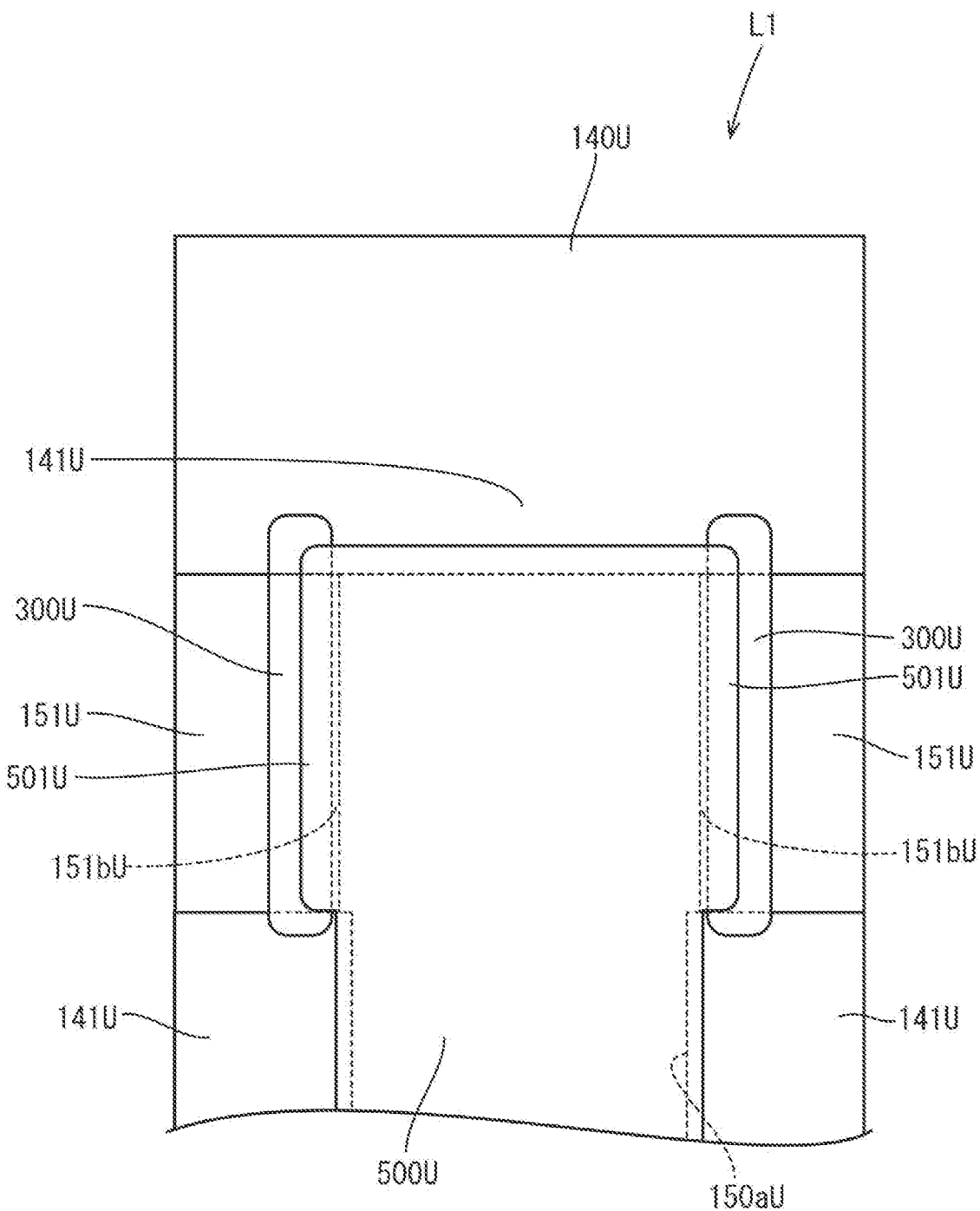
FIG. 10 is a plan view showing a part of the first laminate in a state where a burn-out portion is formed such that end portions thereof overlap the unfired buffer layers in a second formation step.

FIG. 10 is a plan view showing a part of the first laminate L1 in a state where the burn-out portion 500U is formed such that the end portions 501U thereof overlap the unfired buffer layers 300U in second formation step S103.

The burn-out portion 500U is made of a paste material (for example, carbon paste) containing a burn-out material (for example, carbon powder). That is, a known paste material that is generally used for forming an opening is used for the burn-out portion 500U. In consideration of printing misalignment, etc., the burn-out portion 500U fills the opening 150*a*U such that the end portion (peripheral edge) thereof protrudes from the opening 150*a*U.

Since the burn-out portion 500U has a lower shrinkage start temperature than the unfired buffer layers 300U, the unfired gas introduction portion 151U, etc., among them the burn-out portion 500U starts shrinking the earliest in the firing step S105 described below. The end portions 501U of the burn-out portion 500U are portions that are most easily influenced by shrinkage. If such end portions 501U of the burn-out portion 500U are formed so as to directly overlap the unfired gas introduction portions 151U, since the difference between the shrinkage start temperature of the burn-out portion 500U and the shrinkage start temperature of the unfired gas introduction portions 151U is excessively large, the unfired gas introduction portions 151U may be pulled by the end portions 501U during the shrinkage of the burn-out portion 500U, causing defects such as cracks in the unfired gas introduction portions 151U.

In the present embodiment, in order to suppress the occurrence of the above-described defects in the unfired gas introduction portions 151U, the end portions 501U of the burn-out portion 500U are formed so as to be in direct contact with the unfired buffer layers 300U, which are formed so as to overlap the unfired gas introduction portions 151U, and not with the unfired gas introduction portions 151U. Since the shrinkage start temperature of the unfired buffer layers 300U is lower than that of the unfired gas introduction portions 151U, when the end portions 501U of the burn-out portion 500U shrink, the unfired buffer layers 300U which are in direct contact with the end portions 501U can follow the movement of the shrinking end portions 501U faster than the unfired gas introduction portions 151U. Even if the unfired buffer layers 300U are formed on the unfired gas introduction portions 151U, normally, defects do not occur in the unfired gas introduction portions 151U as the unfired buffer layers 300U shrink.

Even if the portion on the center side with respect to the end portions 501U in the burn-out portion 500U comes into direct contact with the unfired gas introduction portions 151U as shown in FIG. 10, etc., normally, this portion (portion on the center side) does not influence the unfired gas introduction portions 151U when the burn-out portion 500U shrinks. Therefore, for achieving the object of the present invention, the portion other than the end portions 501U of the burn-out portion 500U may be in direct contact with the unfired gas introduction portions 151U.

The lamination step S104 is a step in which the first green sheet 121*s*U having the burn-out portion 500U formed thereon and a second green sheet 111*s*U for forming the second ceramic structure 100B are laminated on top of each other.

Figure 11:
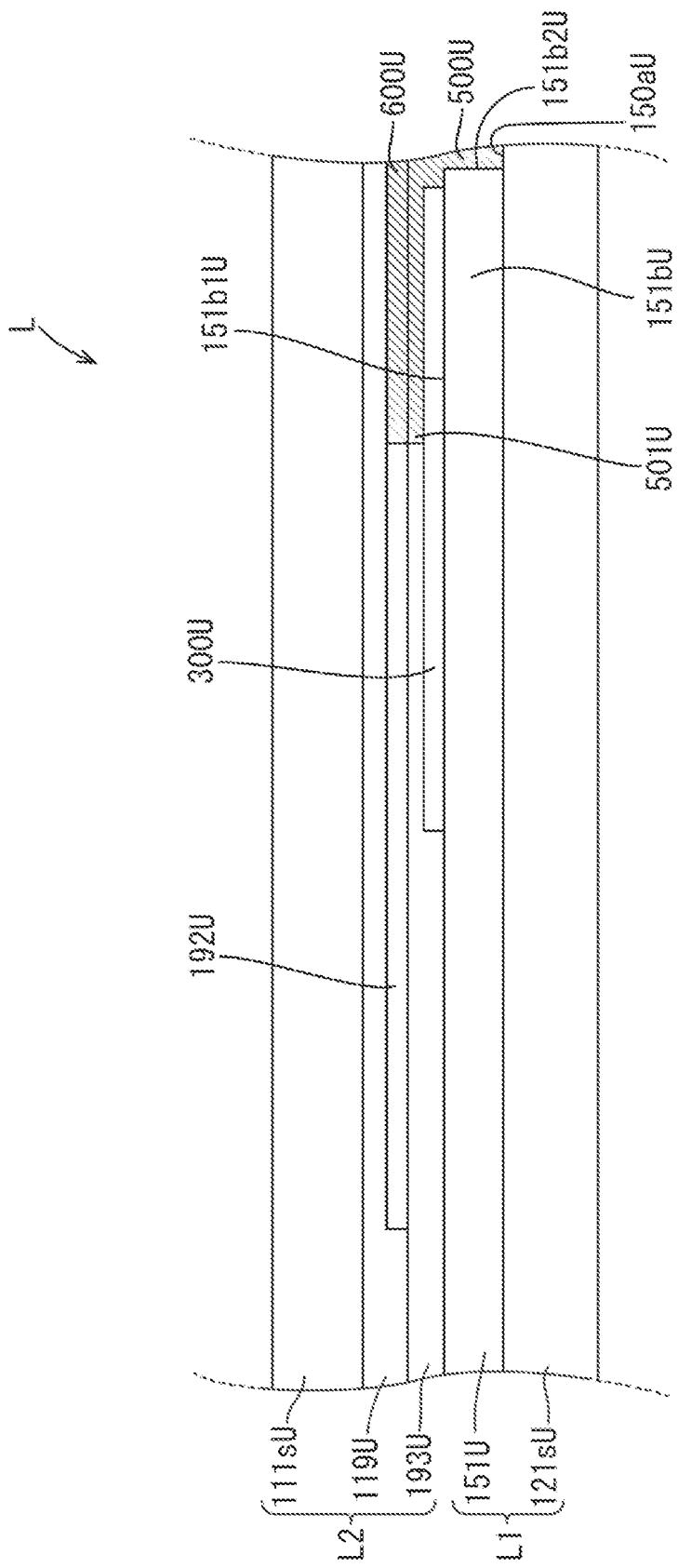
FIG. 11 is a cross-sectional view schematically illustrating the configuration of an unfired laminate for forming the gas sensor element.

In the lamination step S104, the first laminate L1 including the first green sheet 121*s*U having the burn-out portion 500U formed thereon and a second laminate L2 including the second green sheet 111*s*U for forming the second ceramic structure 100B are laminated on top of each other. The second green sheet 111*s*U is a sheet for forming the insulating layer 111*s* included in the second ceramic structure 100B. By laminating such a first laminate L1, such a second laminate L2, etc., an unfired laminate L for forming the gas sensor element 10 is obtained. FIG. 11 is a cross-sectional view schematically illustrating the configuration of the unfired laminate L for forming the gas sensor element 10. In FIG. 11, the laminate L at a location corresponding to the cross-sectional configuration of the gas sensor element 10 of FIG. 6 is shown.

As shown in FIG. 11, the first laminate L1 includes the first green sheet 121sU, the unfired gas introduction portions 151U, the unfired buffer layers 300U, the burn-out portion 500U, etc.

The second laminate L2 includes the second green sheet 111sU, an unfired alumina insulating layer 119U for forming the alumina insulating layer 119, an unfired reinforcing layer 192U for forming the reinforcing layer 192, an unfired adhesive layer 193U for forming the adhesive layer 193, a burn-out portion 600U to be used together with the burn-out portion 500U for forming the opening 150aU, etc. The burn-out portion 600U is made of the same composition as the above-described burn-out portion 500U, and fills the opening 150aU by being overlaid on the burn-out portion 500U. The burn-out portion 600U is formed at a predetermined location on the second green sheet 111sU by printing. The burn-out portion 600U has substantially the same size as the burn-out portion 500U in a plan view.

Each unfired buffer layer 300U is formed on a front surface 151b1U of the inner end portion 151bU. The front surface 151b1U finally becomes the opposed surface 151b1. As shown in FIG. 11, the unfired buffer layer 300U is formed on the front surface 151b1U of the inner end portion 151bU so as not to cover the end surface 151b2U, facing the opening 150aU, of the inner end portion 151bU.

In the lamination step S104, an unfired sheet, etc., required for manufacturing the gas sensor element 10 are further laminated on the first laminate L1, the second laminate L2, etc., as appropriate.

The firing step S105 is a step of firing the laminate L obtained after the lamination step S104. In the firing step S105, by firing the laminate L under a predetermined temperature condition, the gas sensor element 10 is obtained. When the laminate L is fired, the burn-out portions 500U and 600U disappear, and the space (main space) 150a used as the first measurement chamber 150, and the gaps 150b connected to the space 150a are formed.

The invention has been described in detail with reference to the above embodiments. However, the invention should not be construed as being limited thereto. It should further be apparent to those skilled in the art that various changes in form and detail of the invention as shown and described above may be made. It is intended that such changes be included within the spirit and scope of the claims appended hereto.

This application claims priority from Japanese Patent Application No. 2021-141677 filed Aug. 31, 2021, the disclosure of which is incorporated herein by reference in its entirety.

What is claimed is:

1. A gas sensor element comprising a plurality of laminated plate-shaped ceramic structures including:
   a first ceramic structure which has a detection cell including a first solid electrolyte body and a pair of detection electrodes provided on opposing surfaces of the first solid electrolyte body;
   a second ceramic structure which has a pump cell including a second solid electrolyte body and a pair of pump electrodes provided on opposing surfaces of the second solid electrolyte body, the second ceramic structure being disposed apart from the first ceramic structure in a lamination direction; and
   a third ceramic structure which is a layer-shaped structure disposed between the first ceramic structure and the second ceramic structure and having a frame-shaped body surrounding a space formed between the first ceramic structure and the second ceramic structure, the frame-shaped body including a gas introduction portion having one end portion disposed on an external side and another end portion disposed on the space side and made of a porous ceramic allowing to-be-detected external gas to be introduced into the space while allowing the external gas to pass from the one end portion side to the other end portion side, and a peripheral wall portion made of a dense ceramic and surrounding the space together with the gas introduction portion, wherein
   a gap connected to the space is formed between an opposed surface, opposed to the second ceramic structure, of the other end portion of the gas introduction portion and the second ceramic structure, and
   the gas sensor element comprises a buffer layer which is made of ceramic composed of a material having a lower shrinkage start temperature than a material for forming the gas introduction portion and is formed directly on the opposed surface so as to overlap a boundary portion between an edge on the external side of the gap and the second ceramic structure when viewed in the lamination direction.

2. The gas sensor element as claimed in claim 1, wherein the buffer layer is made of a porous ceramic containing pores larger than pores contained in the gas introduction portion.

3. The gas sensor element as claimed in claim 1, wherein the buffer layer is formed on the opposed surface so as not to cover an end surface, facing the space, of the other end portion of the gas introduction portion.

4. The gas sensor element as claimed in claim 1, wherein the second ceramic structure includes
   a plate-shaped body portion which includes the pump cell,
   an adhesive layer which is disposed between the plate-shaped body portion and the third ceramic structure and is composed of a layer of a dense ceramic, and
   a reinforcing layer which is disposed between the plate-shaped body portion and the adhesive layer and is shaped so as to surround the space when viewed in the lamination direction.

5. A gas sensor comprising the gas sensor element as claimed in claim 1.

6. A gas sensor element comprising a plurality of laminated plate-shaped ceramic structures including:
   a first ceramic structure which has a detection cell including a first solid electrolyte body and a pair of detection electrodes provided on opposing surfaces of the first solid electrolyte body;
   a second ceramic structure which has a pump cell including a second solid electrolyte body and a pair of pump electrodes provided on opposing surfaces of the second solid electrolyte body, the second ceramic structure being disposed apart from the first ceramic structure in a lamination direction; and
   a third ceramic structure which is a layer-shaped structure disposed between the first ceramic structure and the second ceramic structure and having a frame-shaped body surrounding a space formed between the first ceramic structure and the second ceramic structure, the frame-shaped body including a gas introduction portion having one end portion disposed on an external side and another end portion disposed on the space side and made of a porous ceramic allowing to-be-detected external gas to be introduced into the space while allowing the external gas to pass from the one end portion side to the other end portion side, and a peripheral wall portion made of a dense ceramic and surrounding the space together with the gas introduction portion, wherein a gap connected to the space is formed between an opposed surface, opposed to the second ceramic structure, of the other end portion of the gas introduction portion and the second ceramic structure, the gas sensor element comprises a buffer layer which is made of ceramic composed of a material having a lower shrinkage start temperature than a material for forming the gas introduction portion and is formed directly on the opposed surface so as to overlap a boundary portion between an edge on the external side of the gap and the second ceramic structure when viewed in the lamination direction;

a material for forming the buffer layer contains zirconia as a main component, and a material for forming the gas introduction portion contains alumina as a main component.

7. A manufacturing method for manufacturing a gas sensor element, the gas sensor element including a plurality of laminated plate-shaped ceramic structures including a first ceramic structure which has a detection cell including a first solid electrolyte body and a pair of detection electrodes provided on opposing surfaces of the first solid electrolyte body, a second ceramic structure which has a pump cell including a second solid electrolyte body and a pair of pump electrodes provided on opposing surfaces of the second solid electrolyte body, the second ceramic structure being disposed apart from the first ceramic structure in a lamination direction, and a third ceramic structure which is a layer-shaped structure disposed between the first ceramic structure and the second ceramic structure and having a frame-shaped body surrounding a space formed between the first ceramic structure and the second ceramic structure, the frame-shaped body including a gas introduction portion having one end portion disposed on an external side and another end portion disposed on the space side and made of a porous ceramic allowing to-be-detected external gas to be introduced into the space while allowing the external gas to pass from the one end portion side to the other end portion side, and a peripheral wall portion made of a dense ceramic and surrounding the space together with the gas introduction portion, the manufacturing method comprising:

an installation step of installing an unfired gas introduction portion made of a material for forming the gas introduction portion and an unfired peripheral wall portion made of a material for forming the peripheral wall portion, on a first green sheet for forming the first ceramic structure, and forming an opening corresponding to the space, on an inner side of the unfired gas introduction portion and the unfired peripheral wall portion;

a first formation step of forming an unfired buffer layer made of a material having a lower shrinkage start temperature than the unfired gas introduction portion, on an inner end portion, corresponding to the other end portion, disposed directly on the opening side of the unfired gas introduction portion, in an overlapping manner;

a second formation step of forming a burn-out portion made of a paste material containing a burn-out material, by printing, such that the burn-out portion fills the opening on the first green sheet and an end portion thereof overlaps the unfired buffer layer while protruding to the unfired gas introduction portion side which is an outer side of the opening;

a lamination step of laminating the first green sheet having the burn-out portion formed thereon and a second green sheet for forming the second ceramic structure, on top of each other; and a firing step of firing a laminate obtained after the lamination step.

8. The manufacturing method for the gas sensor element as claimed in claim 7, wherein the unfired gas introduction portion contains a first burnable powder which is burnt out in the firing step, and the unfired buffer layer contains a second burnable powder which is burnt out in the firing step and has a larger particle size than the first burnable powder.

9. The manufacturing method for the gas sensor element as claimed in claim 8, wherein a content of the second burnable powder in the unfired buffer layer is lower than a content of the first burnable powder in the unfired gas introduction portion.

10. The manufacturing method for the gas sensor element as claimed in claim 8, wherein the second burnable powder is spherical, and the first burnable powder is irregularly shaped.

11. The manufacturing method for the gas sensor element as claimed in claim 7, wherein, in the first formation step, the unfired buffer layer is formed on the inner end portion so as not to cover an end surface, facing the opening, of the inner end portion.

12. A manufacturing method for manufacturing a gas sensor element, the gas sensor element including a plurality of laminated plate-shaped ceramic structures including a first ceramic structure which has a detection cell including a first solid electrolyte body and a pair of detection electrodes provided on opposing surfaces of the first solid electrolyte body, a second ceramic structure which has a pump cell including a second solid electrolyte body and a pair of pump electrodes provided on opposing surfaces of the second solid electrolyte body, the second ceramic structure being disposed apart from the first ceramic structure in a lamination direction, and a third ceramic structure which is a layer-shaped structure disposed between the first ceramic structure and the second ceramic structure and having a frame-shaped body surrounding a space formed between the first ceramic structure and the second ceramic structure, the frame-shaped body including a gas introduction portion having one end portion disposed on an external side and another end portion disposed on the space side and made of a porous ceramic allowing to-be-detected external gas to be introduced into the space while allowing the external gas to pass from the one end portion side to the other end portion side, and a peripheral wall portion made of a dense ceramic and surrounding the space together with the gas introduction portion, the manufacturing method comprising:

an installation step of installing an unfired gas introduction portion made of a material for forming the gas introduction portion and an unfired peripheral wall portion made of a material for forming the peripheral wall portion, on a first green sheet for forming the first ceramic structure, and forming an opening corresponding to the space, on an inner side of the unfired gas introduction portion and the unfired peripheral wall portion;

a first formation step of forming an unfired buffer layer made of a material having a lower shrinkage start temperature than the unfired gas introduction portion, on an inner end portion, corresponding to the other end portion, disposed on the opening side of the unfired gas introduction portion, in an overlapping manner;

a second formation step of forming a burn-out portion made of a paste material containing a burn-out material, by printing, such that the burn-out portion fills the opening on the first green sheet and an end portion thereof overlaps the unfired buffer layer while protruding to the unfired gas introduction portion side which is an outer side of the opening;

a lamination step of laminating the first green sheet having the burn-out portion formed thereon and a second green sheet for forming the second ceramic structure, on top of each other;

a firing step of firing a laminate obtained after the lamination step;

the unfired buffer layer contains zirconia as a main component, and the unfired gas introduction portion contains alumina as a main component.

* * * * *